J. SCHRODER.
Assignor to H. H. PATTEE.
CULTIVATOR.
No. 7,497. Reissued Feb. 6, 1877.
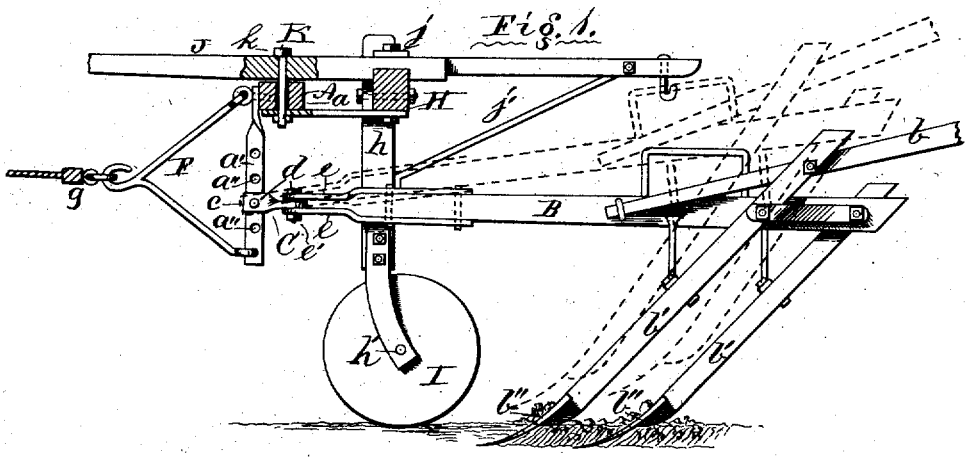
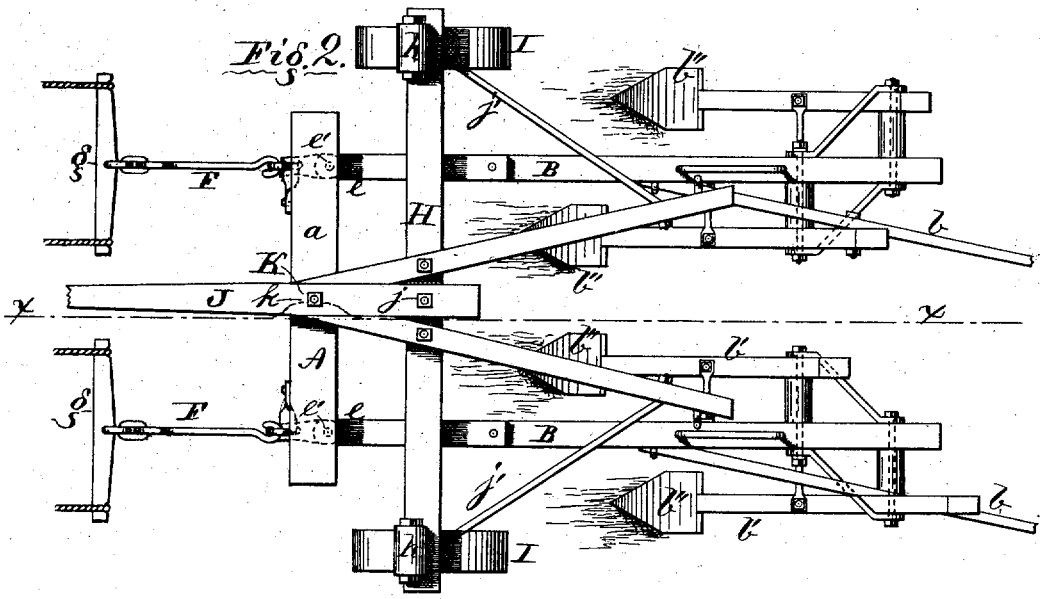
Witnesses:
P. R. Richards
Chas. Lufsper
Inventor:
John Schroder.
By W. B. Richards, Atty.
N. PETERS, PHOTO-LITHOGRAPHER, WASHINGTON, D. C.

UNITED STATES PATENT OFFICE.

JOHN SCHRÖDER, OF KICKAPOO, ASSIGNOR TO HENRY H. PATTEE, OF MONMOUTH, ILLINOIS.

IMPROVEMENT IN CULTIVATORS.

Specification forming part of Letters Patent No. 69,255, dated September 24, 1867; reissue No. 7,497, dated February 6, 1877; application filed January 16, 1877.

DIVISION B.

*To all whom it may concern:*

Be it known that I, JOHN SCHRÖDER, of Kickapoo, in the county of Peoria and State of Illinois, have invented certain new and useful Improvements in Cultivators.

The following description, taken in connection with the accompanying plate of drawings, hereinafter referred to, forms a full and exact specification, wherein are set forth the nature and principles of the invention, by which the same may be distinguished from others for the same general purpose, together with what is claimed as new and desired to be secured by Letters Patent of the United States.

This invention relates to cultivators used to cultivate both sides of a row of growing plants at each passage of the machine, of that class in which two plow-beams are jointed or hinged to a beam-yoke in such manner that either end of said beam-yoke, with its respective plow, may be advanced or receded by the draft-animal attached thereto, without disturbing the parallelism of the plow-beams, which are hinged or jointed to the yoke in such manner as to permit of freely moving or oscillating them independently, as is necessary in use.

The object of this part of my invention is to provide ground-support for the beam-yoke, secured to said yoke in such manner as to permit of either of its ends advancing or receding, while the supports may remain unchanged in their forward movement.

A further object is to provide means of retaining the supports in the line of progression of the machine, while the beam-yoke assumes in operation various oblique angles to said line, all as hereinafter fully described.

In the accompanying drawing, illustrating a machine embodying my invention, Figure 1 is a sectional view in the line *x x* in Fig. 2, and Fig. 2 is a top-plan view.

Referring to the parts by letters, A represents an arched beam-yoke, consisting of an upper central part, *a*, and vertical side portions *a'*. The vertical parts *a'* are flat bars, as shown in the drawings, and pierced with holes *a''*. B B are plow-beams, each having a handle, *b*, and standards *b'*, carrying shovels *b''*, affixed to its rear portions. C C are the joint-pieces for hinging the plow-beams to the beam-yoke A. Their forward ends are bifurcated or formed into two flat plates, *c c*, which embrace a flat bar, *a'*, of the beam-yoke, and are pierced with a hole, through which a bolt, *d*, passes, to pivot them to the bar *a'*, in such manner that they may have only a vertical movement on the bolt *d* as an axis of flexure. The rear ends of the joint-pieces C are flattened, and embraced between an upper and lower plate, *e*, which plates *e* constitute the forward end of the plow-beam, to which the rear ends of plates *c* are pivoted by a bolt, *e'*, on which the plow-beam may have lateral movement only as an axis of flexure. F F are the draft devices, attached at their rear ends, one to each end of the yoke A, and their forward ends carrying each a single-tree, *g*, to which a draft-animal is attached.

The foregoing details constitute an operative cultivator which I do not claim herein, *per se*, but the improvement hereinafter described, and relating to said cultivator.

H is a horizontal bar, with vertical end parts *h*, to which spindles *h'* are affixed, on which the supporting-wheels I I are journaled. J is a guide-pole, mounted transversely on the bar H, and rigidly secured thereto by a bolt, *j*, and braces *j'*. K is a bolt, passing through the pole J near the bar H, (or it may pass through the bar H,) and through the central part of the bar *a* of the beam-yoke A, on which the beam-yoke may oscillate freely, and which will also sustain the yoke in an upright position at all times by means of a nut, *k;* or the yoke may be mounted and pivoted above the pole J for the same purpose.

In operation the draft-animals walk, one on each side of the row of plants to be cultivated, each drawing its adjacent plow. The pole J will thus be brought parallel with the subjacent row of plants, and will retain the wheels I parallel with the line of progression, and the wheels and frame H will, in turn, serve as a support for the arched beam-yoke when the draft of the animals is temporarily removed therefrom, allowing said beam-yoke to advance or recede at either end, with its attached plow, without disturbing the direct forward path of the wheels.

Having thus described my invention, what I claim as new, and desire to secure by Letters Patent, is—

1. The frame H, supported on wheels I I, and combined to operate with the pivoted beam-yoke A and beams B B as a support, substantially as described, and for the purpose specified.

2. The guide-pole J, frame H, and wheels I I, arranged to operate with the beam-yoke A, pivoted to the frame H, and having plow-beams B B hinged thereto, substantially as described, and for the purpose specified.

In testimony that I claim the foregoing as my invention, I hereto annex my signature in presence of two witnesses.

JOHN SCHRÖDER.

Witnesses:
A. M. GIBBONS,
J. C. MCKENZIE.